(12) United States Patent
Hayashi et al.

(10) Patent No.: US 9,400,352 B2
(45) Date of Patent: Jul. 26, 2016

(54) POLARIZATION-MAINTAINING OPTICAL FIBER

(71) Applicant: FUJIKURA LTD., Koto-ku, Tokyo (JP)

(72) Inventors: Kazuyuki Hayashi, Sakura (JP); Katsuaki Izoe, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/628,450

(22) Filed: Feb. 23, 2015

(65) Prior Publication Data

US 2015/0268413 A1  Sep. 24, 2015

(30) Foreign Application Priority Data

Mar. 20, 2014 (JP) ................... 2014-058874

(51) Int. Cl.
  *G02B 6/02* (2006.01)
  *G02B 6/028* (2006.01)
  *G02B 6/024* (2006.01)
  *G02B 6/036* (2006.01)

(52) U.S. Cl.
  CPC ............... *G02B 6/024* (2013.01); *G02B 6/0365* (2013.01)

(58) Field of Classification Search
  None
  See application file for complete search history.

(56) References Cited

U.S. PATENT DOCUMENTS

| | | | | |
|---|---|---|---|---|
| 4,913,521 A | * | 4/1990 | Tajima | .................... G01L 1/242 385/126 |
| 2004/0258377 A1 | * | 12/2004 | Berkey | .............. C03B 37/01217 385/123 |
| 2006/0039665 A1 | | 2/2006 | Matsuo et al. | |
| 2012/0275750 A1 | * | 11/2012 | Kozlov | ............ B29D 11/00644 385/125 |
| 2013/0071082 A1 | * | 3/2013 | Gagnon | ................. G02B 6/024 385/124 |
| 2014/0212083 A1 | * | 7/2014 | Pare | ....................... G02B 6/024 385/11 |

FOREIGN PATENT DOCUMENTS

| | | |
|---|---|---|
| CN | 103018821 A | 4/2013 |
| EP | 1988411 A1 | 11/2008 |
| EP | 2597500 A1 | 5/2013 |
| JP | 2003-337238 A | 11/2003 |

OTHER PUBLICATIONS

K. Takenaga, et al., "Highly Birefringent Photonic Crystal Fiber for a Wide Wavelength Range", Fujikura Technical Journal, Apr. 2005, pp. 6-9, No. 108.
Communication dated Aug. 18, 2015 from the European Patent Office in counterpart application No. 15156197.4.
(Continued)

*Primary Examiner* — Hemang Sanghavi
(74) *Attorney, Agent, or Firm* — Sughrue Mion, PLLC (57) ABSTRACT

A polarization-maintaining optical fiber of the invention includes: a core; a pair of stress-applying parts disposed at both sides of the core at a distance; and a cladding coat that surrounds the core and the paired stress-applying parts. The maximum refractive index of the core is greater than each of maximum refractive indexes of a first cladding coat, a second cladding coat, and a third cladding coat. The maximum refractive index of the second cladding coat is lower than each of maximum refractive indexes of the first cladding coat and the third cladding coat. The coefficient of thermal expansion of each of stress-applying parts is greater than a coefficient of thermal expansion of the cladding coat. Each stress-applying part is provided to cut the second cladding coat at a position in a circumferential direction.

10 Claims, 6 Drawing Sheets

(56) References Cited

OTHER PUBLICATIONS

Yoo S et al: Linearly polarized ytterbium-doped fiber laser in a pedestal design with aluminosilicate inner cladding, Laser Physics Letters, Wiley—V C H Verlag Gmbh & Co. KGAA, Germany, vol. 8, No. 6, Apr. 5, 2011, pp. 453-457, XP008163871, ISSN: 1612-2011, DOI: 10.1002/LAPL.201110018 [retrieved on Apr. 5, 2011] * figure 1 *.

Communication dated Oct. 27, 2015, from the Japanese Patent Office in counterpart application No. 2014-058874.

Kazuyuki Hayashi, Katsuaki Izoe, Kazuhiko Aikawa, Manabu Kudo, High Performance Polarization Maintaining Optical Fiber, IEICE Technical Report, Japan, The Institute of Electronics, Information and Communication Engineers, May 22, 2014, vol. 114, No. 64, pp. 25 to 30.

Kazuyuki Hayashi, Katsuaki Izoe, Kazuhiko Aikawa, Manabu 3 Kudo, Bend Insensitive PANDA Fiber, Fujikura Technical Review, Japan, Fujikura Ltd., Dec. 20, 2014, No. 127, pp. 9 to 12.

Fujikazu Kitamura, Yutaka Sasaki, Optimum Design for Polarization Crosstalk Reduction in a Polarization-Maintaining Optical Fiber of PANDA Profile, The IEICE Transactions C-I, Japan, The Institute of Electronics, Information and Communication Engineers, Mar. 25, 1995, vol. J78-C-1, No. 3, pp. 150 to 156.

* cited by examiner

POLARIZATION-MAINTAINING OPTICAL FIBER

CROSS-REFERENCE TO RELATED APPLICATION

This application is based on and claims priority from Japanese Patent Application No. 2014-058874 filed on Mar. 20, 2014, the contents of which are incorporated herein by reference in their entirety.

BACKGROUND OF THE INVENTION

1. Field of the Invention

The present invention relates to a polarization-maintaining optical fiber.

2. Description of the Related Art

Conventionally, a polarization-maintaining optical fiber is used to, for example, connect optical devices each other having polarization dependence in an optical transmission system or the like.

As this kind of polarization-maintaining optical fiber, as disclosed in, for example, Japanese Unexamined Patent Application, First Publication No. 2003-337238 (hereinafter, refer to Patent Document 1), a polarization-maintaining optical fiber is known which includes: a pair of stress-applying parts provided at both sides of a core; and a cladding surrounding the core and the paired stress-applying parts.

In recent years, there is a growing need for a reduction in size of a module or the like which includes the above-described optical device. In accordance with this, it is required to reduce a size (curvature radius) of a polarization-maintaining optical fiber used in such module and use it therefor.

In the aforementioned conventional polarization-maintaining optical fiber, as a result of setting a relative refractive index difference between a core and a cladding greater, it is possible to increase a degree of optical confinement into the core.

Accordingly, even where a polarization-maintaining optical fiber is bent so as to have a small radius, it is possible to reduce an increase in a bending loss.

Furthermore, in the aforementioned conventional polarization-maintaining optical fiber, even where the polarization-maintaining optical fiber is bent so as to have a small radius by arranging the paired stress-applying parts close to the core, it is possible to reduce an increase in polarization crosstalk (bending polarization crosstalk).

Moreover, conventionally, as other optical fibers which can reduce an increase in a bending loss or polarization crosstalk even where the optical fiber is bent so as to have a small radius, a polarization-maintaining photonic crystal fiber is also known in which a plurality of air holes around a core area are formed (Katsuhiro Takenaga, et. al, "Broadband Polarization-Maintaining Photonic Crystal Fiber", Technical Report by Fujikura Ltd., April, 2005, 108th, p6-9, hereinafter, refer to Non-Patent Document 1).

However, in the polarization-maintaining optical fiber disclosed in Patent Document 1, there is a problem in that, as a relative refractive index difference between the core and the cladding increases, mode field diameter (mode field diameter) becomes smaller.

In this case, a difference in a mode field diameter between the above-mentioned polarization-maintaining optical fiber and an existing optical fiber optically connected thereto (single-mode fiber (SMF) or other polarization-maintaining optical fibers) increases and a connection loss between the above-mentioned polarization-maintaining optical fiber and the existing optical fiber thereby increases.

In addition, as the mode field diameter of the polarization-maintaining optical fiber becomes smaller, it is difficult to optically connect the polarization-maintaining optical fiber to the optical device.

On the other hand, in the case of using the polarization-maintaining photonic crystal fiber in disclosed in Non-Patent Document 1, it is possible to reduce an increase in a bending loss or polarization crosstalk when the optical fiber is bent so as to have a small radius while setting the mode field diameter large; however, it is difficult to manufacture the polarization-maintaining photonic crystal fiber and it is also difficult to reduce the manufacturing cost.

SUMMARY OF THE INVENTION

The invention was conceived in view of the above-described circumstances and has an object thereof to provide a polarization-maintaining optical fiber which can make the mode field diameter thereof large while reducing an increase in a bending loss and polarization crosstalk even where the fiber is bent so as to have a small radius and furthermore can be easily and inexpensively manufactured.

In order to solve the above-mentioned problem, a polarization-maintaining optical fiber according to an aspect of the invention includes: a core; a pair of stress-applying parts disposed at both sides of the core at a distance; and a cladding coat that surrounds the core and the paired stress-applying parts, wherein the cladding coat includes: a first cladding coat disposed around the core; a second cladding coat disposed around the first cladding coat; and a third cladding coat disposed around the second cladding coat, and wherein a maximum refractive index of the core is greater than each of maximum refractive indexes of the first cladding coat, the second cladding coat, and the third cladding coat, a maximum refractive index of the second cladding coat is lower than each of maximum refractive indexes of the first cladding coat and the third cladding coat, a coefficient of thermal expansion of each of stress-applying parts is greater than a coefficient of thermal expansion of the cladding coat, and each stress-applying part is provided to cut the second cladding coat at a position in a circumferential direction. For example, the stress-applying parts are provided so as to separate the second cladding coat into two parts. The stress-applying parts are disposed in part of the third cladding coat and in of the first cladding coat.

In the polarization-maintaining optical fiber according to the aspect of the invention, as a result of configuring the cladding coat to provide the second cladding coat between the first and the third cladding coats and the refractive index of the second cladding coat is lower than those of the first and the third cladding coats, a refractive index profile with respect to the radial direction of the polarization-maintaining optical fiber has a trench shape (trench profile).

In this configuration, it is possible to set the mode field diameter (mode field diameter) larger.

Furthermore, in this configuration, a difference between the refractive index of the second cladding coat and the effective refractive index that is obtained at the outer edge of the mode field can be large. Therefore, as compared with the case of using an optical fiber having a profile which does not have a trench shape (single-peaked profile), it is possible to reduce a bending loss when the optical fiber is bent so as to have a small radius.

That is, in the polarization-maintaining optical fiber according to this aspect, it is possible to reduce a bending loss of the optical fiber without reducing the mode field diameter when the optical fiber is bent so as to have a small radius.

Furthermore, a pair of stress-applying parts that apply a stress to the core and thereby apply birefringence thereto are provided in the polarization-maintaining optical fiber according to the aspect of the invention.

Moreover, the distance between the paired stress-applying parts is narrow so that each stress-applying part cuts at least the second cladding coat and it is possible to reduce an increase in polarization crosstalk (bending polarization crosstalk) which is generated when the optical fiber is bent so as to have a small radius.

Additionally, in the polarization-maintaining optical fiber, the stress-applying part may be provided to protrude from a boundary between the first cladding coat and the second cladding coat in a radial-inner direction.

In this case, it is possible to further reduce an increase in polarization crosstalk which is generated when the optical fiber is bent so as to have a small radius.

Moreover, in the polarization-maintaining optical fiber, where a radius of the core is represented as r1 and a radius of an outer edge of the first cladding coat is represented as r2, a value of r2/r1 is in a range of 2.5 to 4.5. A relative refractive index difference of the core with reference to the maximum refractive index of the third cladding coat is in a range of 0.20% to 0.70%. Where a radius with reference to a center of the core is represented as r, a relative refractive index difference in the radius r with reference to the maximum refractive index of the third cladding coat is represented as $\Delta n(r)$ and a radius of an inner edge of the second cladding coat is represented as r3, a refractive index volume V of the second cladding coat expressed by the following numerical expression (1) is in a range of 25%·μm² to 110%·μm². A diameter of each stress-applying part is in a range of 30 to 40 μm, and a distance between the paired stress-applying parts is less than or equal to 20 μm.

(Expression 1)

$$V = 2\int_{r2}^{r3} |\Delta n(r)| \cdot r \, dr \qquad (1)$$

Furthermore, in the polarization-maintaining optical fiber, the refractive index volume V of the second cladding coat may be greater than or equal to 50%·μm².

In addition, a relative refractive index difference of the first cladding coat with reference to the maximum refractive index of the third cladding coat may be in a range of −0.10% to 0.05%. A relative refractive index difference of the second cladding coat with reference to the maximum refractive index of the third cladding coat may be in a range of −0.60% to −0.20%.

Furthermore, in the polarization-maintaining optical fiber, a cut-off wavelength of the polarization-maintaining optical fiber may be less than or equal to 1.44 μm a mode field diameter of the polarization-maintaining optical fiber in an operating wavelength of 1.55 μm may be greater than or equal to 7.9 μm, the polarization-maintaining optical fiber may propagate light having an operating wavelength of up to 1.65 μm in a single-mode, and in a case where the polarization-maintaining optical fiber is wound around a 10 mm-diameter mandrel 10 times, a bending loss thereof and polarization crosstalk are measured, the measurement value of the bending loss may be less than or equal to 0.05 dB, and the measurement value of the polarization crosstalk thereof may be less than or equal to −30 dB.

Moreover, in the polarization-maintaining optical fiber, a cut-off wavelength of the polarization-maintaining optical fiber may be less than or equal to 1.30 μm, the polarization-maintaining optical fiber may propagate light having an operating wavelength of 1.31 μm in a single-mode, a mode field diameter of the polarization-maintaining optical fiber in an operating wavelength of 1.31 μm is greater than or equal to 6.6 μm, and in a case where the polarization-maintaining optical fiber is wound around a 10 mm-diameter mandrel 10 times, a bending loss thereof and polarization crosstalk are measured, the measurement value of the bending loss may be less than or equal to 0.05 dB, and the measurement value of the polarization crosstalk thereof is less than or equal to −30 dB.

In addition, in the polarization-maintaining optical fiber, a cut-off wavelength of the polarization-maintaining optical fiber may be less than or equal to 0.97 μm, the polarization-maintaining optical fiber may propagate light having an operating wavelength of 0.98 μm in a single-mode, a mode field diameter of the polarization-maintaining optical fiber in an operating wavelength of 0.98 nm may be greater than or equal to 4.7 μm, and in a case where the polarization-maintaining optical fiber is wound around a 10 mm-diameter mandrel 10 times, a bending loss thereof and polarization crosstalk are measured, the measurement value of the bending loss may be less than or equal to 0.05 dB, and the measurement value of the polarization crosstalk thereof is less than or equal to −30 dB.

Furthermore, in the polarization-maintaining optical fiber, a cut-off wavelength of the polarization-maintaining optical fiber may be less than or equal to 0.84 μm, the polarization-maintaining optical fiber may propagate light having an operating wavelength of 0.85 μm in a single-mode, a mode field diameter of the polarization-maintaining optical fiber in an operating wavelength of 0.85 μm may be greater than or equal to 3.9 μm, and in a case where the polarization-maintaining optical fiber is wound around a 10 mm-diameter mandrel 10 times, a bending loss thereof and polarization crosstalk are measured, the measurement value of the bending loss may be less than or equal to 0.05 dB, and the measurement value of the polarization crosstalk thereof is less than or equal to −30 dB.

Effects of the Invention

According to the aspect of the invention, it is possible to provide the polarization-maintaining optical fiber by which the mode field diameter can be large while preventing an increase in a bending loss and polarization crosstalk even in a state of being bent so as to have a small radius.

Furthermore, since the mode field diameter can be large, it is possible to reduce and lower a connection loss between the polarization-maintaining optical fiber and the existing optical fiber.

Moreover, it is possible to provide the polarization-maintaining optical fiber that can be produced easier than and cheaper than a polarization-maintaining photonic crystal fiber.

DETAILED DESCRIPTION OF THE INVENTION

Hereinafter, a polarization-maintaining optical fiber according to one of embodiments of the invention will be described with reference to FIGS. 1 to 6.

Figure 1:
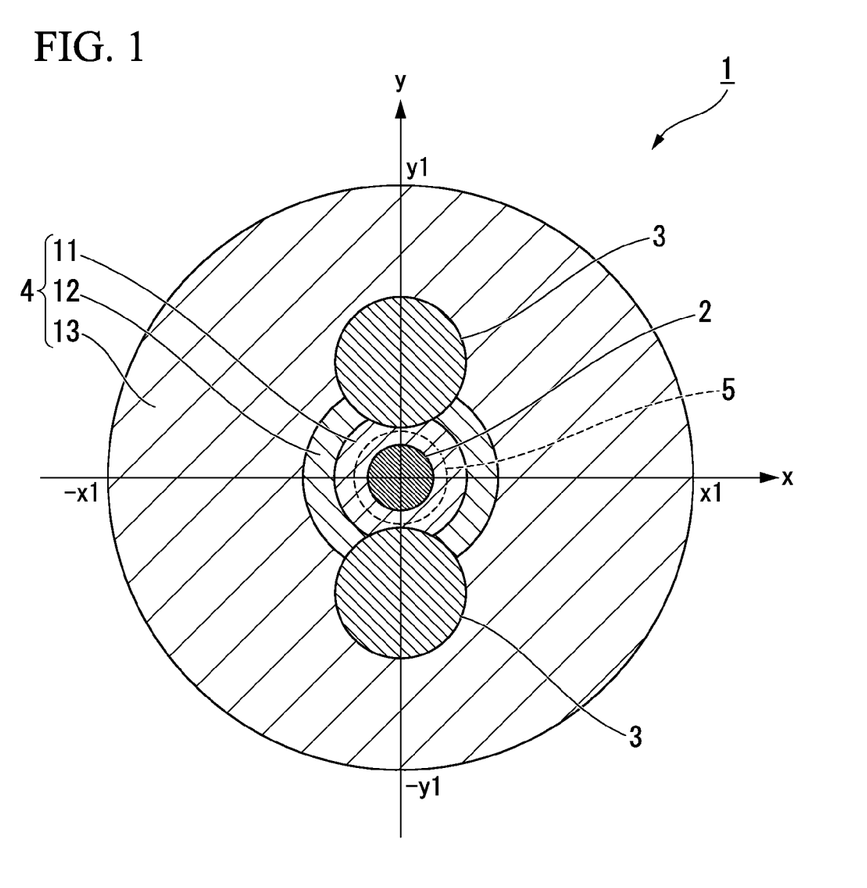
FIG. 1 is a cross-sectional view substantially showing a polarization-maintaining optical fiber according to an embodiment of the invention.
Figure 2:
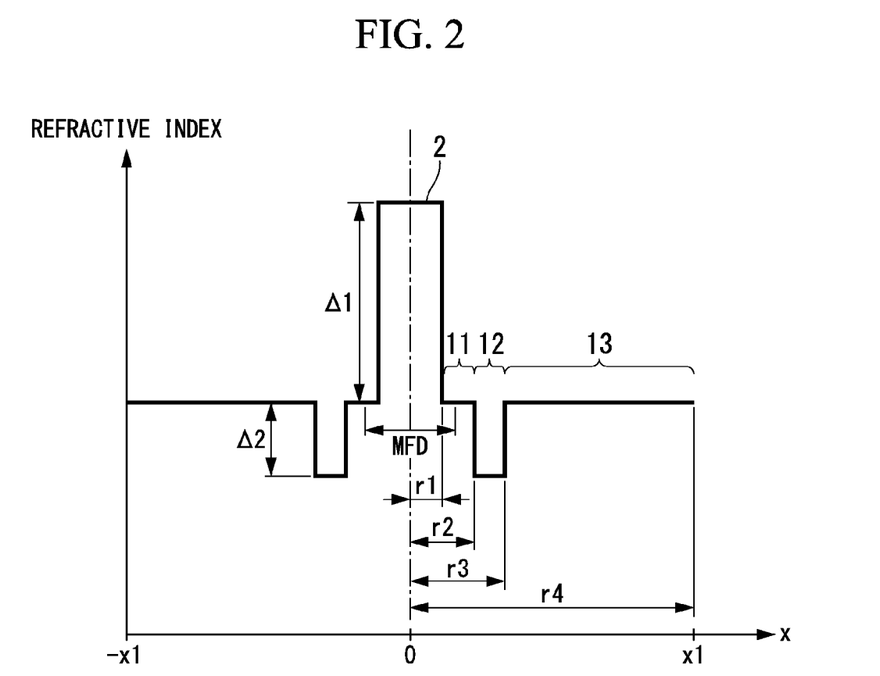
FIG. 2 is a chart showing a refractive index profile in the x-axial direction in the polarization-maintaining optical fiber shown in FIG. 1.

As shown in FIGS. 1 and 2, a polarization-maintaining optical fiber 1 according to the embodiment includes: a core 2 having a radius of r1; a pair of stress-applying parts 3 that are disposed at both sides of the core 2 at a distance; and a cladding coat 4 that surrounds the core 2 and the paired stress-applying parts 3.

The cladding coat 4 includes: a first cladding coat 11 that has a radius r2 and is disposed around the core 21; a second cladding coat 12 that has a radius r3 and is disposed around the first cladding coat 11; and a third cladding coat 13 that has a radius r4 and is disposed around the second cladding coat 12.

As shown in FIG. 2, the maximum refractive index of the core 2 is greater than each of the maximum refractive indexes of the above-described first cladding coat 11, second cladding coat 12, and third cladding coat 13.

Additionally, the maximum refractive index of the second cladding coat 12 is lower than the maximum refractive indexes of the first cladding coat 11 and the third cladding coat 13.

Regarding the above-described maximum refractive indexes, the maximum refractive index in the region in the radial direction from the center of the core 2 to the outer edge thereof is defined as the maximum refractive index of the core 2; the maximum refractive index in the region in the radial direction from the inner edge of the first cladding coat 11 to the outer edge thereof is defined as the maximum refractive index of the first cladding coat 11; the maximum refractive index in the region in the radial direction from the inner edge of the second cladding coat 12 to the outer edge thereof is defined as the maximum refractive index of the second cladding coat 12; and the maximum refractive index in the region in the radial direction from the inner edge of the third cladding coat 13 to the outer edge thereof is defined as the maximum refractive index of the third cladding coat 13.

In the refractive index profile shown in FIG. 2, since the refractive indexes of the core 2 are constant regardless of positions thereof in the radial direction, the refractive index is the maximum refractive indexes of the core 2; since the refractive indexes of the first cladding coat 11 are constant regardless of positions thereof in the radial direction, the refractive index is the maximum refractive index of the first cladding coat 11; since the refractive indexes of the second cladding coat 12 are constant regardless of positions thereof in the radial direction, the refractive index is the maximum refractive index of the second cladding coat 12; and since the refractive indexes of the third cladding coat 13 are constant regardless of positions thereof in the radial direction, the refractive index is the maximum refractive index of the third cladding coat 13.

As described above, the cladding coat 4 is configured so that the second cladding coat 12 having the refractive index lower than those of the first cladding coat 11 and the third cladding coat 13 is provided between the first cladding coat 11 and the third cladding coat 13, and the polarization-maintaining optical fiber 1 according to the embodiment thereby has a refractive index profile (refractive index profile) with respect to the radial direction of the polarization-maintaining optical fiber 1 that has a profile having a trench shape (trench profile) as shown in FIG. 2.

In the polarization-maintaining optical fiber 1 according to the embodiment having such trench profile, a diameter of the mode field 5 (hereinbelow, referred to as a mode field diameter) can be larger as shown in FIG. 1.

Furthermore, a difference between the effective refractive index on the outer edge of the mode field 5 and the refractive index of the second cladding coat 12 can be larger. Therefore, as compared with the case of using a conventional polarization-maintaining optical fiber (in which the cladding coat 4 is a single polarization-maintaining optical fiber) having a common single-peaked profile which does not has a trench shape, it is possible to reduce a bending loss when the optical fiber is bent so as to have a small radius.

That is, in the polarization-maintaining optical fiber according to the embodiment, it is possible to reduce a bending loss of the optical fiber without reducing the mode field diameter when the optical fiber is bent so as to have a small radius.

Figure 3:
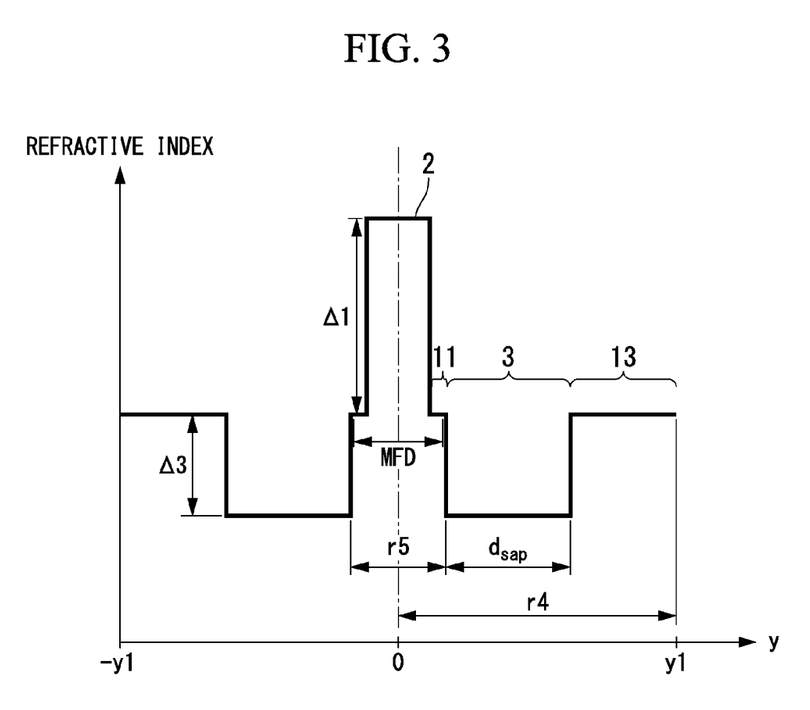
FIG. 3 is a chart showing a refractive index profile in the y-axial direction in the polarization-maintaining optical fiber shown in FIG. 1.

Particularly, the above-mentioned mode field diameter is represented by reference letter "MFD" in FIGS. 2 and 3.

The paired stress-applying parts 3 apply a stress to the core 2 and thereby apply birefringence thereto.

As shown in FIG. 1, each stress-applying part 3 is formed in a circular cross section.

The coefficient of thermal expansion of each stress-applying part 3 is higher than the coefficient of thermal expansion of the cladding coat 4.

The stress-applying parts 3 is provided to cut the second cladding coat 12 at the position in a circumferential direction (at the position of the second cladding coat 12 in the circumferential direction of the second cladding coat 12). In other words, the stress-applying parts 3 cut the second cladding coat 12 so that the stress-applying parts 3 sandwich the first cladding coat 11, and two second cladding coats 12 are thereby formed in an arc-shape on the first cladding coat 11 in the circumferential direction of the first cladding coat 11. The center of the core 2, the center of the first cladding coat 11, the center of the second cladding coat 12 (the center of the virtual circle forming the arc-shape of two second cladding coats 12), and the two centers of the stress-applying parts 3 are positioned on the same line (on the line extending in the y-axial direction shown in FIG. 1).

In FIG. 1, each stress-applying part 3 is provided to protrude in the radial-inner direction from the boundary between the first cladding coat 11 and the second cladding coat 12; however, for example, the stress-applying part 3 may be provided so as not to protrude in the radial-inner direction from the boundary between the first cladding coat 11 and the second cladding coat 12.

Additionally, each stress-applying part 3 is provided to protrude in the radial-outer direction from the boundary between the second cladding coat 12 and the third cladding coat 13.

Furthermore, as shown in FIG. 3, the maximum refractive index of each stress-applying part 3 is lower than the maximum refractive indexes of the first cladding coat 11 and the third cladding coat 13.

Moreover, the maximum refractive index of each stress-applying part 3 is lower than the maximum refractive index of the second cladding coat 12.

The maximum refractive index in the region in the radial direction from the center of each stress-applying part 3 to the outer edge thereof is defined as the above-described maximum refractive index of each stress-applying part 3.

In the refractive index profile shown in FIG. 3, since the refractive indexes of the stress-applying part 3 are constant regardless of positions thereof in the radial direction, the refractive index is the maximum refractive index of the stress-applying part 3.

As described above, the gap r5 between the paired stress-applying parts 3 is narrow to the extent that each stress-applying part 3 cuts the second cladding coat 12, and it is possible to reduce an increase in polarization crosstalk (bending polarization crosstalk) which is generated when the optical fiber is bent so as to have a small radius.

In addition, as constituent materials of the above-described core 2, the paired stress-applying parts 3, and the cladding coat 4 (the first cladding coat 11, the second cladding coat 12, and the third cladding coat 13), any materials are optionally selected and used as long as such materials are used to form a polarization-maintaining optical fiber (PANDA polarization-maintaining optical fiber) including the paired stress-applying parts 3.

For example, silica into which GeO2 is doped may be used as the core 2, pure silica may be used as the first cladding coat 11 and the third cladding coat 13, silica into which fluorine is doped may be used as the second cladding coat 12, and silica into which boron is doped may be used as each stress-applying part 3.

Moreover, in the polarization-maintaining optical fiber 1 according to the embodiment, where the radius of the core 2 is represented as r1 and the radius of the outer edge of the first cladding coat 11 (the inner edge of the second cladding coat 12) is represented as r2, the value of r2/r1 is preferably in a range of 2.5 to 4.5 and more preferably in a range of 3.0 to 4.5.

As a result of providing the second cladding coat 12 on the position at which the value of r2/r1 is greater than or equal to 2.5, it is possible to reduce a bending loss of the optical fiber while reducing and lowering variation in mode field diameter.

Furthermore, in the case of providing the second cladding coat 12 on the position at which the value of r2/r1 is greater than or equal to 3.0, the variation in mode field diameter is further reduced, and it is possible to further reduce and lower a bending loss of the optical fiber.

Here, the value of r2/r1 is less than or equal to 4.5. The reason is that, in the case where the r2/r1 excessively increases, the optical characteristics, particularly, a cut-off wavelength of the optical fiber, which are due to change in relative refractive index difference of the first cladding coat 11 described later, significantly vary, and the manufacturability thereof is deteriorated.

In the case where the r2/r1 excessively increases, the effect due to provision of the second cladding coat 12 is reduced, and transmission in a single-mode becomes difficult.

Furthermore, the relative refractive index difference of the first cladding coat 11 with reference to the maximum refractive index of the third cladding coat 13 is preferably in a range of −0.10% to 0.05% and more preferably in a range of −0.10% to 0.00%.

In the case where the relative refractive index difference of the first cladding coat 11 excessively increases, a cut-off wavelength of the optical fiber becomes larger.

On the other hand, in the case where the relative refractive index difference of the first cladding coat 11 excessively decreases, a degree of optical confinement due to the first cladding coat 11 increases. In this case, it is possible to reduce a bending loss of the optical fiber; in contrast, a mode field diameter becomes smaller, and connection loss with respect to an existing optical fiber (single-mode fiber or other polarization-maintaining optical fiber) increases.

Consequently, it is preferable to set the relative refractive index difference of the first cladding coat 11 to be in the above-described range so that provisions of a desired cut-off wavelength and a desired mode field diameter and reduction in bending loss can be simultaneously realized.

Furthermore, in the polarization-maintaining optical fiber 1 according to the embodiment, where the radius with reference to the center of the core 2 is represented by r, the relative refractive index difference in the case of the radius r with reference to the maximum refractive index of the third cladding coat 13 is represented by Δn (r), the radius of the inner edge of the second cladding coat 12 (the radius of the first cladding coat 11) is represented by r2, the radius of the outer edge of the second cladding coat 12 is represented by r3, the refractive index volume V of the second cladding coat 12 is expressed by the following numerical expression (I).

(Expression 1)

$$V = 2\int_{r2}^{r3} |\Delta n(r)| \cdot r \, dr \quad (1)$$

Here, a polarization-maintaining optical fiber having a single-peaked profile and a mandrel having a predetermined diameter are prepared, the polarization-maintaining optical fiber having a single-peaked profile is wound around the mandrel ten times, that is, the number of windings thereof is 10, a bending loss in a predetermined wavelength is measured, and a value of increase in bending loss is obtained (reference value (A) of increase in bending loss). The polarization-maintaining optical fiber 1 according to the embodiment and the mandrel that is the same as the above-described mandrel are prepared, the polarization-maintaining optical fiber 1 is wound around the mandrel and the number of windings thereof is 10, a bending loss in the predetermined wavelength is measured by the same method described above, and a value of increase in bending loss is obtained (value (B) of increase in bending loss of the embodiment). Next, a bending loss ratio is determined which means the ratio of the value (B) of increase in bending loss of the embodiment to the reference value (A) of increase in bending loss in the predetermined wavelength, which are obtained by the above measurement method. The bending loss ratio is in a correlation with the refractive index volume V which is represented by the aforementioned the value of r2/r1 and the above-mentioned numerical expression (1).

Specifically, the bending loss ratio tends to be lower with an increase in the refractive index volume V, and the relationship between the refractive index volume V and the bending loss is determined depending on the value of r2/r1, i.e., the position of the low-refractive index layer (the second cladding coat 12).

Because of this, in order to provide more excellent bending loss, the refractive index volume V is preferably greater than or equal to 25%·μm² and more preferably greater than or equal to 50%·μm².

Moreover, in the polarization-maintaining optical fiber 1 according to the embodiment, the relative refractive index difference Δ1 of the core 2 with reference to the maximum refractive index of the third cladding coat 13 (refer to FIGS. 2 and 3) is preferably in a range of 0.20% to 0.70% and more preferably in a range of 0.25% to 0.65%.

In this case, it is possible to reduce a bending loss of the optical fiber without reducing the mode field diameter when the optical fiber is bent so as to have a small radius.

Furthermore, the relative refractive index difference Δ2 of the second cladding coat 12 with reference to the maximum refractive index of the third cladding coat 13 (refer to FIG. 2) is preferably in a range of −0.6% to −0.2%.

This range is defined by the above-mentioned refractive index volume V.

Additionally, the gap r5 between the paired stress-applying parts 3 (refer to FIG. 3) is preferably less than or equal to 20 μm.

The reason is that, as shown in Tables 1 to 3 which will be described later, in the case where the gap r5 exceeds 20 μm, polarization crosstalk which is generated when the optical fiber is bent so as to have a small radius increases and thereby exceeds the acceptable range.

Figure 4:
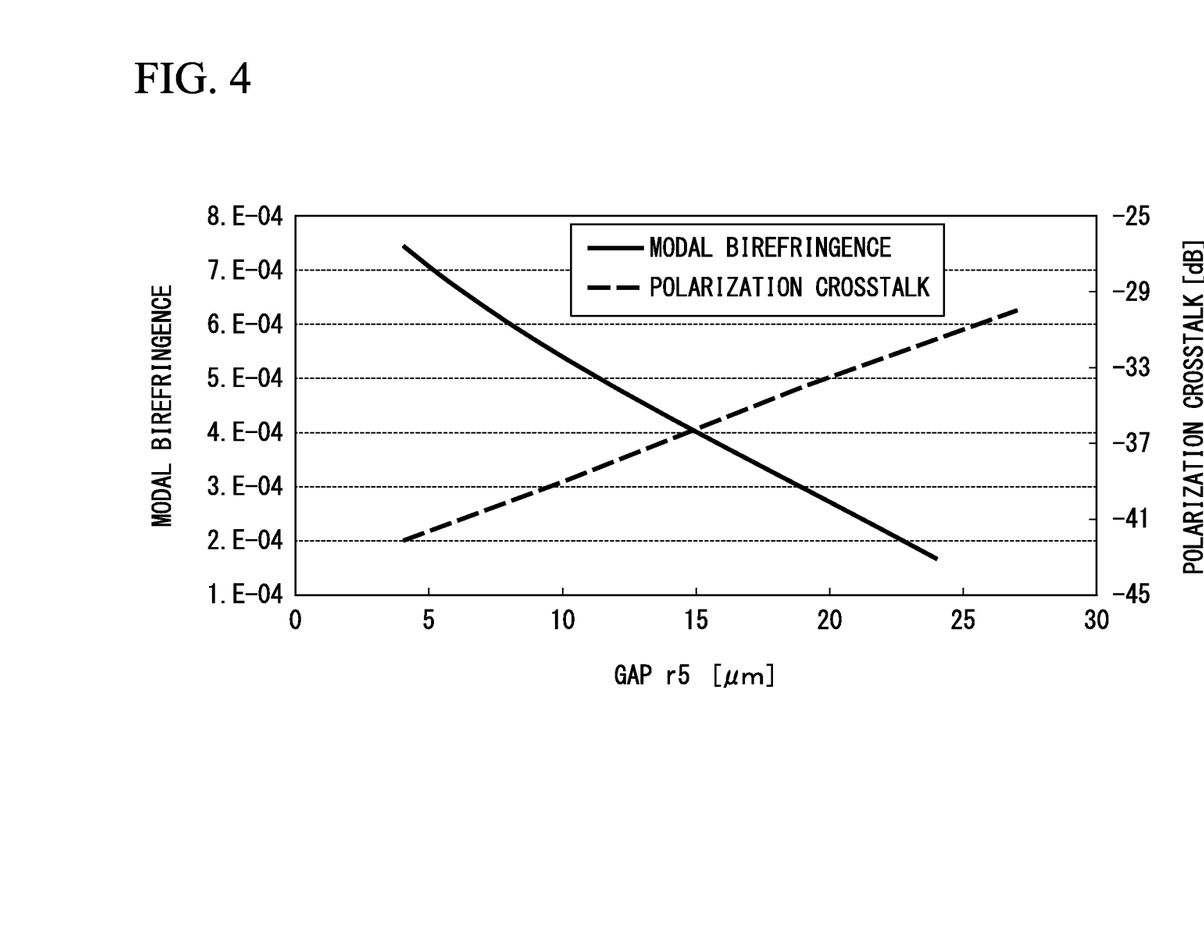
FIG. 4 is a chart showing a relationship of a distance between a pair of stress-applying parts, a modal birefringence, and polarization crosstalk in the case where the diameter of a mandrel is a constant diameter, around which the polarization-maintaining optical fiber is wound.

However, as shown in FIG. 4, the modal birefringence with respect to the above-described gap r5 (the difference between equivalent refractive indexes nx and ny with respect to two polarization modes (x-polarization, y-polarization) orthogonal to each other in the polarization-maintaining optical fiber) is inversely proportional to the polarization crosstalk.

That is, as the gap r5 decreases, the modal birefringence increases and the polarization crosstalk decreases, and the characteristics thereof is thereby improved.

However, it is preferable to set the above-described gap r5 to be greater than or equal to the mode field diameter so that the stress-applying part 3 does not overlap the mode field 5 (so that the stress-applying part 3 does not come in to contact with the mode field 5).

Additionally, the diameter $d_{sap}$ of each stress-applying part 3 (refer to FIG. 3) is preferably in a range of 30 to 40 μm.

Figure 5:
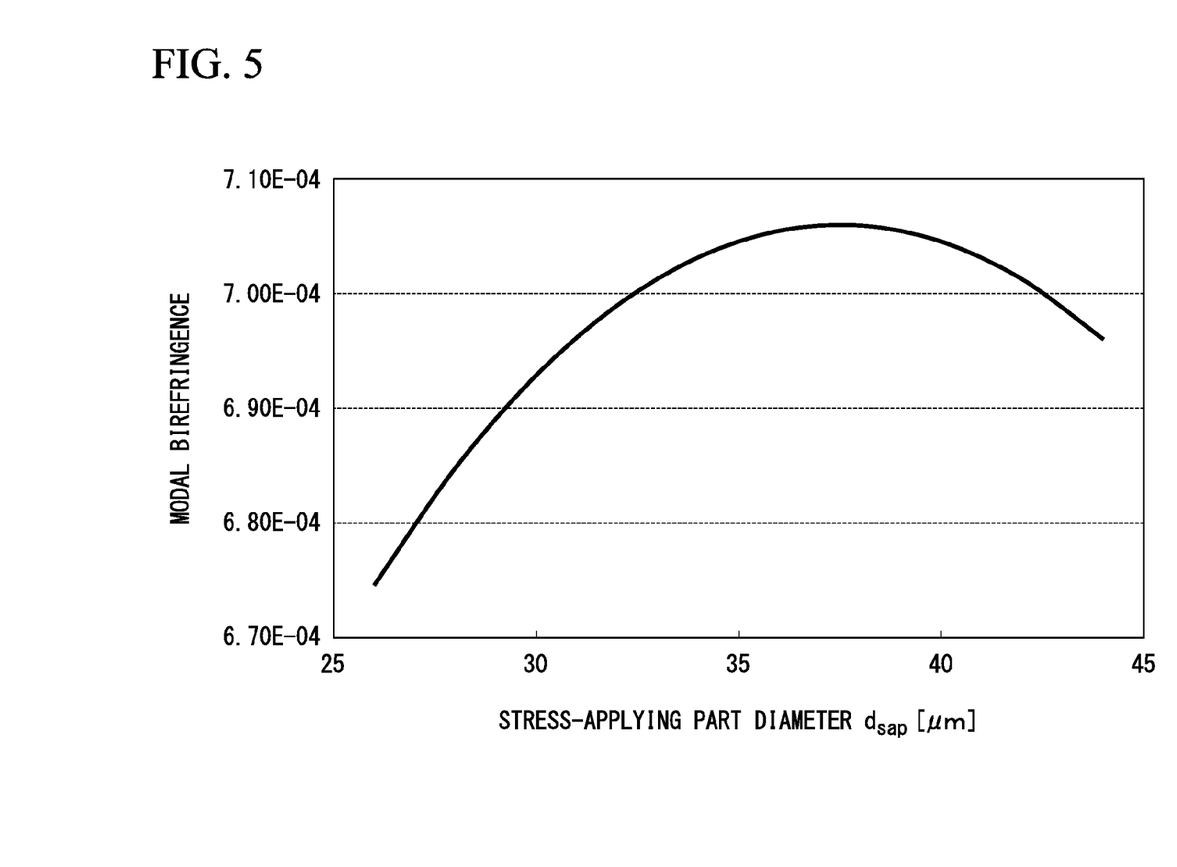
FIG. 5 is a chart showing a relationship between a diameter of the stress-applying part and a modal birefringence in the case where a distance between the paired stress-applying parts is a constant distance.

The reason is that, in the case where the diameter $d_{sap}$ of the stress-applying part 3 is smaller than 30 μm or greater than 40 μm as shown in FIG. 5, the modal birefringence becomes significantly large, and the characteristics are degraded.

The degree of change in modal birefringence with respect to change in the diameter $d_{sap}$ of the stress-applying part 3 shown in FIG. 5 is lower than the degree of change in modal birefringence with respect to change in the gap r5 between the stress-applying parts 3 shown in FIG. 4; however, it is preferable to set the diameter $d_{sap}$ of each stress-applying part 3 as described above.

Consequently, according to the above-described embodiment, it is possible to obtain the polarization-maintaining optical fiber 1 by which the mode field diameter can be large while preventing an increase in a bending loss and polarization crosstalk even in a state of being bent so as to have a small radius.

Furthermore, since the mode field diameter can be large, it is possible to reduce and lower a connection loss between the polarization-maintaining optical fiber and the existing optical fiber.

Moreover, it is possible to provide the polarization-maintaining optical fiber 1 that can be produced easier than and cheaper than a polarization-maintaining photonic crystal fiber.

Particularly, as shown in Examples 1 and 5 shown in Tables 1 and 2 which will be described later as an example, a polarization-maintaining optical fiber is obtained which has a cut-off wavelength of 1.44 μm or less and a mode field diameter of 7.9 μm or more in an operating wavelength of 1.55 μm and which propagates light having an operating wavelength of up to 1.65 μm in a single-mode. Additionally, in the case where the polarization-maintaining optical fiber is wound around a 10 mm-diameter mandrel 10 turns, that is, the number of windings thereof is 10, a bending loss thereof and polarization crosstalk are measured, the measurement value of the bending loss is less than or equal to 0.05 dB, and the measurement value of the polarization crosstalk thereof is less than or equal to −30 dB.

Additionally, in the polarization-maintaining optical fiber, the mode field diameter thereof is less than or equal to, for example, 9.9 μm.

Furthermore, as shown in Examples 2 and 6 shown in Tables 1 and 2 which will be described later as an example, a polarization-maintaining optical fiber is obtained which has a cut-off wavelength of 1.30 μm or less and a mode field diameter of 6.6 μm or more in an operating wavelength of 1.31 μm and which propagates light having an operating wavelength of up to 1.31 μm in a single-mode. Additionally, in the case where the polarization-maintaining optical fiber is wound around a 10 mm-diameter mandrel 10 turns, that is, the number of windings thereof is 10, a bending loss thereof and polarization crosstalk are measured, the measurement value of the bending loss is less than or equal to 0.05 dB, and the measurement value of the polarization crosstalk thereof is less than or equal to −30 dB.

Moreover, in the polarization-maintaining optical fiber, the mode field diameter thereof is less than or equal to, for example, 8.6 μm.

In addition, as shown in Examples 3 and 7 shown in Tables 1 and 2 which will be described later as an example, a polarization-maintaining optical fiber is obtained which has a cut-off wavelength of 0.97 μm or less and a mode field diameter of 4.7 μm or more in an operating wavelength of 0.98 μm and which propagates light having an operating wavelength of up to 0.98 μm in a single-mode. Additionally, in the case where the polarization-maintaining optical fiber is wound around a 10 mm-diameter mandrel 10 turns, that is, the number of windings thereof is 10, a bending loss thereof and polarization crosstalk are measured, the measurement value of the bending loss is less than or equal to 0.05 dB, and the measurement value of the polarization crosstalk thereof is less than or equal to −30 dB.

Furthermore, in the polarization-maintaining optical fiber, the mode field diameter thereof is less than or equal to, for example, 6.7 μm.

Moreover, as shown in Examples 4 and 8 shown in Tables 1 and 2 which will be described later as an example, a polarization-maintaining optical fiber is obtained which has a cut-off wavelength of 0.84 μm or less and a mode field diameter of 3.9 μm or more in an operating wavelength of 0.85 μm and which propagates light having an operating wavelength of up to 0.85 μm in a single-mode. Additionally, in the case where the polarization-maintaining optical fiber is wound around a 10 mm-diameter mandrel 10 turns, that is, the number of windings thereof is 10, a bending loss thereof and polarization crosstalk are measured, the measurement value of the bending loss is less than or equal to 0.05 dB, and the measurement value of the polarization crosstalk thereof is less than or equal to −30 dB.

Additionally, in the polarization-maintaining optical fiber, the mode field diameter thereof is less than or equal to, for example, 5.9 μm.

Examples

Hereinbelow, effects of the invention are clarified with reference to Examples 1 to 8 and Comparative Examples 9 to 16 shown in Tables 1 to 4.

TABLE 1

| ITEMS | UNITS | EXAMPLES 1 | 2 | 3 | 4 |
|---|---|---|---|---|---|
| OPERATING WAVELENGTH | μm | 1.55 | 1.31 | 0.98 | 0.85 |
| CUT-OFF WAVELENGTH | μm | 1.44 | 1.25 | 0.92 | 0.8 |
| MODE FIELD DIAMETER | μm | 8.9 | 7.6 | 5.7 | 4.9 |
| TRANSMISSION LOSS | dB/Km | 1.72 | 2 | 1.1 | 2.03 |
| REFRACTIVE INDEX DIFFERENCE Δ1 OF CORE | — | 0.4 | | | |
| REFRACTIVE INDEX DIFFERENCE Δ2 OF SECOND CLADDING COAT | — | −0.26 | | | |
| OUTER RADIUS r2 OF FIRST CLADDING COAT | μm | 10 | | | |
| RADIUS r4 OF CLADDING | μm | 125 | | | |
| COATING RADIUS | μm | 245 | | | |
| DIAMETER $d_{sap}$ OF STRESS-APPLYING PART | μm | 35 | | | |
| GAP r5 OF STRESS-APPLYING PART | μm | 10 | | | |
| MODAL BIREFRINGENCE | — | $7.0 \times 10^{-4}$ | | | |
| BENDING LOSS | dB/φ 15 mm × 10 TURNS | 0.01 | | | |
| | dB/φ 10 mm × 10 TURNS | 0.02 | | | |
| POLARIZATION CROSSTALK | dB/φ 15 mm × 10 TURNS | −39 | | | |
| | dB/φ 10 mm × 10 TURNS | −35 | | | |

TABLE 2

| ITEMS | UNITS | EXAMPLES 5 | 6 | 7 | 8 |
|---|---|---|---|---|---|
| OPERATING WAVELENGTH | μm | 1.55 | 1.31 | 0.98 | 0.85 |
| CUT-OFF WAVELENGTH | μm | 1.44 | 1.25 | 0.92 | 0.8 |
| MODE FIELD DIAMETER | μm | 8.9 | 7.6 | 5.7 | 4.9 |
| TRANSMISSION LOSS | dB/Km | 0.26 | 0.4 | 1.06 | 1.95 |
| REFRACTIVE INDEX DIFFERENCE Δ1 OF CORE | — | 0.4 | | | |
| REFRACTIVE INDEX DIFFERENCE Δ2 OF SECOND CLADDING COAT | — | −0.26 | | | |
| OUTER RADIUS r2 OF FIRST CLADDING COAT | μm | 10 | | | |
| RADIUS r4 OF CLADDING | μm | 125 | | | |
| COATING RADIUS | μm | 245 | | | |
| DIAMETER $d_{sap}$ OF STRESS-APPLYING PART | μm | 35 | | | |
| GAP r5 OF STRESS-APPLYING PART | μm | 19 | | | |
| MODAL BIREFRINGENCE | — | $3.8 \times 10^{-4}$ | | | |
| BENDING LOSS | dB/φ 15 mm × 10 TURNS | 0.01 | | | |
| | dB/φ 10 mm × 10 TURNS | 0.02 | | | |
| POLARIZATION CROSSTALK | dB/φ 15 mm × 10 TURNS | −34 | | | |
| | dB/φ 10 mm × 10 TURNS | −30 | | | |

TABLE 3

| ITEMS | UNITS | COMPARATIVE EXAMPLES 9 | 10 | 11 | 12 |
|---|---|---|---|---|---|
| OPERATING WAVELENGTH | μm | 1.55 | 1.31 | 0.98 | 0.85 |
| CUT-OFF WAVELENGTH | μm | 1.44 | 1.25 | 0.92 | 0.8 |
| MODE FIELD DIAMETER | μm | 8.9 | 7.6 | 5.7 | 4.9 |
| TRANSMISSION LOSS | dB/Km | 0.27 | 0.39 | 1.03 | 1.9 |
| REFRACTIVE INDEX DIFFERENCE Δ1 OF CORE | — | 0.4 | | | |
| REFRACTIVE INDEX DIFFERENCE Δ2 OF SECOND CLADDING COAT | — | −0.26 | | | |
| OUTER RADIUS r2 OF FIRST CLADDING COAT | μm | 10 | | | |
| RADIUS r4 OF CLADDING | μm | 125 | | | |
| COATING RADIUS | μm | 245 | | | |
| DIAMETER $d_{sap}$ OF STRESS-APPLYING PART | μm | 35 | | | |
| GAP r5 OF STRESS-APPLYING PART | μm | 27 | | | |
| MODAL BIREFRINGENCE | — | $2.7 \times 10^{-4}$ | | | |
| BENDING LOSS | dB/φ 15 mm × 10 TURNS | 0.01 | | | |
| | dB/φ 10 mm × 10 TURNS | 0.02 | | | |
| POLARIZATION CROSSTALK | dB/φ 15 mm × 10 TURNS | −30 | | | |
| | dB/φ 10 mm × 10 TURNS | −22 | | | |

TABLE 4

| ITEMS | UNITS | COMPARATIVE EXAMPLES 13 | 14 | 15 | 16 |
|---|---|---|---|---|---|
| OPERATING WAVELENGTH | μm | 1.55 | 1.31 | 0.98 | 0.85 |
| CUT-OFF WAVELENGTH | μm | 1.44 | 1.25 | 0.92 | 0.8 |
| MODE FIELD DIAMETER | μm | 8.9 | 7.6 | 5.7 | 4.9 |
| TRANSMISSION | dB/Km | 1.8 | 2.05 | 1.12 | 2.09 |

TABLE 4-continued

| ITEMS | UNITS | COMPARATIVE EXAMPLES | | | |
|---|---|---|---|---|---|
| | | 13 | 14 | 15 | 16 |
| LOSS | | | | | |
| REFRACTIVE INDEX DIFFERENCE Δ1 OF CORE | — | | 0.4 | | |
| REFRACTIVE INDEX DIFFERENCE Δ2 OF SECOND CLADDING COAT | — | | 0 | | |
| OUTER RADIUS r2 OF FIRST CLADDING COAT | μm | | — | | |
| RADIUS r4 OF CLADDING | μm | | 125 | | |
| COATING RADIUS | μm | | 245 | | |
| DIAMETER $d_{sap}$ OF STRESS-APPLYING PART | μm | | 35 | | |
| GAP r5 OF STRESS-APPLYING PART | μm | | 10 | | |
| MODAL BIREFRINGENCE | — | | $7.0 \times 10^{-4}$ | | |
| BENDING LOSS | dB/φ 15 mm × 10 TURNS | | 0.1 | | |
| | dB/φ 10 mm × 10 TURNS | | 0.3 | | |
| POLARIZATION CROSSTALK | dB/φ 15 mm × 10 TURNS | | −29 | | |
| | dB/φ 10 mm × 10 TURNS | | −24 | | |

All of Examples 1 to 4 shown in Table 1 and Examples 5 to 8 shown in Table 2 are the polarization-maintaining optical fiber 1 according to the embodiment.

In all Examples 1 to 8, the gap r5 between the stress-applying parts 3 is less than or equal to the diameter of the first cladding coat 11 (r2×2).

That is, in all Examples 1 to 8, each stress-applying part 3 protrudes in the radial-inner direction from the boundary between the first cladding coat 11 and the second cladding coat 12 (toward the first cladding coat 11) (refer to FIG. 1).

However, in Examples 1 to 4, the amount of protrusion of each stress-applying part 3 with respect to the first cladding coat 11 is 5 μm. In contrast, in Examples 5 to 8, the amount of protrusion of each stress-applying part 3 is 0.5 μm, that is, extremely small.

This means that, in Examples 5 to 8, the protrusion position of each stress-applying part 3 in the radial-inner direction substantially coincides with the boundary between the first cladding coat 11 and the second cladding coat 12.

On the other hand, Comparative Examples 9 to 12 shown in Table 3 are different from the above-described Examples 1 to 8 only in the gap r5 between the stress-applying parts 3.

In all Comparative Examples 9 to 12, the gap r5 between the stress-applying parts 3 is greater than the diameter of the first cladding coat 11 (r2×2).

That is, in all Comparative Examples 9 to 12, each stress-applying part 3 is located at the outer side of the boundary between the first cladding coat 11 and the second cladding coat 12 in the radial-outer direction, and is different from Examples 1 to 8 such that the stress-applying part 3 does not protrude toward the first cladding coat 11.

Accordingly, in Comparative Examples 9 to 12, the second cladding coat 12 is not cut by the stress-applying part 3 at the position in the circumferential direction.

Furthermore, the gap r5 between the stress-applying parts 3 of Comparative Examples 13 to 16 shown in Table 4 are the same as that of the aforementioned Examples 1 to 4; however, a refractive index difference between the second cladding coat 12 and the third cladding coat 13 is absent in these Comparative Examples.

This means that, the optical fibers of Comparative Examples 13 to 16 are conventional polarization-maintaining optical fibers having a general single-peaked profile.

Particularly, in Tables 1 to 4, all items of the mode field diameter, the transmission loss, the bending loss, and the polarization crosstalk indicates values obtained in an operating wavelength.

Furthermore, the values of the bending loss and the polarization crosstalk in Tables 1 to 4 are values which are obtained by winding the optical fiber 10 times around a mandrel having a diameter of 10 mm or around a mandrel having a diameter of 15 mm.

Moreover, in Tables 1 to 4, both the refractive index difference Δ1 of the core and the refractive index difference Δ2 of the second cladding coat are relative refractive index differences with reference to the refractive index of the third cladding coat 13.

In all cases of comparing Examples 1 to 8 and Comparative Examples 9 to 12, even where the gap r5 between the stress-applying parts 3 varies, the bending loss does not change, and the value of the bending loss is adequately in a permissible range.

In contrast to this, the more the gap r5 between the stress-applying parts 3 increases, the more the value of polarization crosstalk increases.

Specifically, since it is preferable that the value of polarization crosstalk be less than or equal to −30 dB, an increase in polarization crosstalk is suitably reduced in Examples 1 to 8. However, in Comparative Examples 9 to 12, the polarization crosstalk increases so as to exceed the acceptable range.

Figure 6:
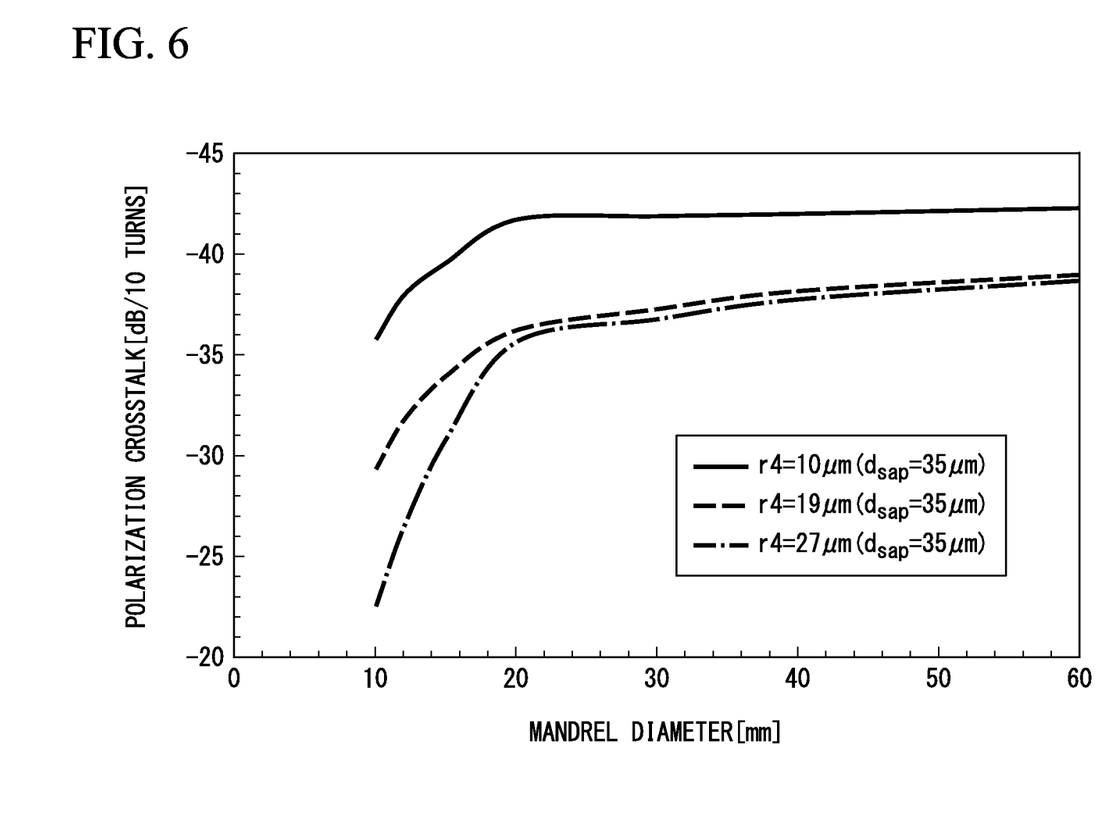
FIG. 6 is a chart showing a relationship between the diameter of the mandrel and polarization crosstalk of the polarization-maintaining optical fiber which is wound around the mandrel in the case where a diameter of the stress-applying part is a constant diameter.

Moreover, regarding Examples 1 to 8 (r4=10 μm, 19 μm) and Comparative Examples 9 to 12 (r4=27 μm), FIG. 6 shows the relationship between the diameter of a mandrel when the diameter ($L_{sap}$) of the stress-applying part 3 is constant (35 μm) and the polarization crosstalk of the polarization-maintaining optical fiber wound around the mandrel.

According to the chart shown in FIG. 6, even in all cases of Examples 1 to 8 and Comparative Examples 9 to 12, particularly, in the case where the diameter of a mandrel is in a range of 20 mm or less, the polarization crosstalk tends to increase with a decrease in the diameter of the mandrel.

However, in Examples 1 to 8, the degree of increase in polarization crosstalk is smaller than that of Comparative Examples 9 to 12.

That is, in Examples 1 to 8, it is possible to preferably reduce an increase in polarization crosstalk.

Furthermore, in the case of comparing Examples 1 to 4 and Examples 5 to 8 with reference to Tables 1 and 2 and FIG. 6, the values of polarization crosstalk in the cases of Examples 1 to 4 are reduced to be lower than that of Examples 5 to 8.

That is, in order to reduce and lower an increase in polarization crosstalk, it is preferable that the gap r5 between the stress-applying parts 3 be small.

However, it is not preferable that the gap r5 between the stress-applying parts 3 be excessively small.

For example, in the case of determining the gap r5 between the stress-applying parts 3 so that the stress-applying part 3 comes into contact with the core 2, the mode field 5 is formed in a substantially elliptical shape due to the influence of formation of the stress-applying part 3 (the mode field 5 is formed in a non-circular shape), a connection loss between the above-mentioned polarization-maintaining optical fiber and the existing optical fiber (single-mode fiber or other polarization-maintaining optical fiber) increases.

Additionally, as an operating wavelength becomes longer, the mode field diameter increases; however, in the case where the stress-applying part 3 overlaps the mode field 5, a transmission loss increases.

For this reason, the gap r5 between the stress-applying parts 3 in Examples 1 to 4 is 10 µm so that the stress-applying part 3 does not overlap the mode field 5.

However, in the case where the polarization-maintaining optical fiber 1 according to the embodiment has a shorter length and the optical fiber is used, even where a transmission loss increases at some level, a problem does not occur. Therefore, the gap r5 between the stress-applying parts 3 may be narrow to the extent that at least the shape of the mode field 5 does not become non-circular shape.

Furthermore, in the case of comparing Examples 1 to 4 and Comparative Examples 13 to 16, Examples are not different from Comparative Examples in the mode field diameter or the modal birefringence; however, the bending losses of Examples 1 to 4 are low, therefore, the bending losses of Examples are approximately ⅒ of the bending losses of Comparative Examples 13 to 16.

Additionally, the degrees of polarization crosstalk of Examples 1 to 4 are reduced to be lower than that of Comparative Examples 13 to 16.

As described above, according to Examples 1 to 8, while setting the mode field diameter large, it is possible to reduce and lower an increase in a bending loss or polarization crosstalk when the optical fiber is bent so as to have a small radius.

Particularly, in Examples 1 to 4, it is possible to reduce and lower an increase in polarization crosstalk to be low.

Furthermore, since it is possible to make the mode field diameter large, it is possible to reduce and lower a connecting loss between the above-mentioned polarization-maintaining optical fiber and an existing optical fiber.

Moreover, according to the results shown in Tables 1 and 2, even where a polarization-maintaining optical fiber having an operating wavelength of up to 0.85 µm is obtained by changing the ratio in diameter of the core 2 to the cladding coat 4 as shown in Examples 4 and 8, sufficiently-excellent bending properties (bending loss and polarization crosstalk) can be obtained.

The preferred embodiments of the present invention have been described above. However, it should be noted that these embodiments are merely examples of the present invention and do not limit the present invention. Additions, omissions, substitutions, and other modifications can be made within a range not departing from the scope of the present invention. Accordingly, the present invention is not limited the above description and is only limited to Claims.

What is claimed is:

1. A polarization-maintaining optical fiber comprising:
a core;
a pair of stress-applying parts disposed at both sides of the core at a distance; and
a cladding coat that surrounds the core and the paired stress-applying parts, wherein the cladding coat comprises:
a first cladding coat disposed around the core;
a second cladding coat disposed around the first cladding coat; and
a third cladding coat disposed around the second cladding coat, wherein
a maximum refractive index of the core is greater than each of maximum refractive indexes of the first cladding coat, the second cladding coat, and the third cladding coat,
a maximum refractive index of the second cladding coat is lower than each of maximum refractive indexes of the first cladding coat and the third cladding coat,
a coefficient of thermal expansion of each of stress-applying parts is greater than a coefficient of thermal expansion of the cladding coat, and
each stress-applying part is provided to cut the second cladding coat at a position in a circumferential direction, and wherein
each stress-applying part is provided to protrude from a boundary between the second cladding coat and the third cladding coat in a radial-outer direction, and
each stress-applying part is in contact with the first cladding coat, the second cladding coat, and the third cladding coat.

2. The polarization-maintaining optical fiber according to claim 1, wherein
the stress-applying part is provided to protrude from a boundary between the first cladding coat and the second cladding coat in a radial-inner direction.

3. The polarization-maintaining optical fiber according to claim 1, wherein
where a radius of the core is represented as r1 and a radius of an outer edge of the first cladding coat is represented as r2, a value of r2/r1 is in a range of 2.5 to 4.5,
a relative refractive index difference of the core with reference to the maximum refractive index of the third cladding coat is in a range of 0.20% to 0.70%,
where a radius with reference to a center of the core is represented as r, a relative refractive index difference in the radius r with reference to the maximum refractive index of the third cladding coat is represented as $\Delta n(r)$ and a radius of an inner edge of the second cladding coat is represented as r3, a refractive index volume V of the second cladding coat expressed by the following numerical expression (1) is in a range of 25%·µm² to 110%·µm², (Expression 1)

$$V = 2\int_{r2}^{r3} |\Delta n(r)| \cdot r\, dr \tag{1}$$

a diameter of each stress-applying part is in a range of 30 to 40 and
a distance between the paired stress-applying parts is less than or equal to 20 µm.

4. The polarization-maintaining optical fiber according to claim 3, wherein
the refractive index volume V of the second cladding coat is greater than or equal to 50%·µm².

5. The polarization-maintaining optical fiber according to claim 3, wherein
a relative refractive index difference of the first cladding coat with reference to the maximum refractive index of the third cladding coat is in a range of −0.10% to 0.05%.

6. The polarization-maintaining optical fiber according to claim 3, wherein a relative refractive index difference of the second cladding coat with reference to the maximum refractive index of the third cladding coat is in a range of −0.60% to −0.20%.

7. The polarization-maintaining optical fiber according to claim 3, wherein a cut-off wavelength of the polarization-maintaining optical fiber is less than or equal to 1.44 μm, a mode field diameter of the polarization-maintaining optical fiber in an operating wavelength of 1.55 μm is greater than or equal to 7.9 μm, the polarization-maintaining optical fiber propagates light having an operating wavelength of up to 1.65 μm in a single-mode, and in a case where the polarization-maintaining optical fiber is wound around a 10 mm-diameter mandrel 10 times, a bending loss thereof and polarization crosstalk are measured, the measurement value of the bending loss is less than or equal to 0.05 dB, and the measurement value of the polarization crosstalk thereof is less than or equal to −30 dB.

8. The polarization-maintaining optical fiber according to claim 3, wherein a cut-off wavelength of the polarization-maintaining optical fiber is less than or equal to 1.30 μm, the polarization-maintaining optical fiber propagates light having an operating wavelength of 1.31 μm in a single-mode, a mode field diameter of the polarization-maintaining optical fiber in an operating wavelength of 1.31 μm is greater than or equal to 6.6 μm, and in a case where the polarization-maintaining optical fiber is wound around a 10 mm-diameter mandrel 10 times, a bending loss thereof and polarization crosstalk are measured, the measurement value of the bending loss is less than or equal to 0.05 dB, and the measurement value of the polarization crosstalk thereof is less than or equal to −30 dB.

9. The polarization-maintaining optical fiber according to claim 3, wherein a cut-off wavelength of the polarization-maintaining optical fiber is less than or equal to 0.97 μm, the polarization-maintaining optical fiber propagates light having an operating wavelength of 0.98 μm in a single-mode, a mode field diameter of the polarization-maintaining optical fiber in an operating wavelength of 0.98 μm is greater than or equal to 4.7 μm, and in a case where the polarization-maintaining optical fiber is wound around a 10 mm-diameter mandrel 10 times, a bending loss thereof and polarization crosstalk are measured, the measurement value of the bending loss is less than or equal to 0.05 dB, and the measurement value of the polarization crosstalk thereof is less than or equal to −30 dB.

10. The polarization-maintaining optical fiber according to claim 3, wherein a cut-off wavelength of the polarization-maintaining optical fiber is less than or equal to 0.84 μm, the polarization-maintaining optical fiber propagates light having an operating wavelength of 0.85 μm in a single-mode, a mode field diameter of the polarization-maintaining optical fiber in an operating wavelength of 0.85 μm is greater than or equal to 3.9 μm, and in a case where the polarization-maintaining optical fiber is wound around a 10 mm-diameter mandrel 10 times, a bending loss thereof and polarization crosstalk are measured, the measurement value of the bending loss is less than or equal to 0.05 dB, and the measurement value of the polarization crosstalk thereof is less than or equal to −30 dB.

\* \* \* \* \*